(12) United States Patent
Steynberg et al.

(10) Patent No.: US 10,058,838 B2
(45) Date of Patent: Aug. 28, 2018

(54) METHOD OF SHUTTING DOWN AN OPERATING THREE-PHASE SLURRY BUBBLE COLUMN REACTOR

(71) Applicant: Sasol Technology Proprietary Limited, Johannesburg (ZA)

(72) Inventors: André Peter Steynberg, Randburg (ZA); Darrell Duane Kinzler, Houston, TX (US)

(73) Assignee: SASOL TECHNOLOGY PROPRIETARY LIMITED, Johannesburg (ZA)

( * ) Notice: Subject to any disclaimer, the term of this patent is extended or adjusted under 35 U.S.C. 154(b) by 0 days.

(21) Appl. No.: 15/103,404

(22) PCT Filed: Dec. 4, 2014

(86) PCT No.: PCT/IB2014/066587
§ 371 (c)(1),
(2) Date: Jun. 10, 2016

(87) PCT Pub. No.: WO2015/087211
PCT Pub. Date: Jun. 18, 2015

(65) Prior Publication Data
US 2016/0310925 A1    Oct. 27, 2016

(30) Foreign Application Priority Data
Dec. 11, 2013 (ZA) .................. 2013/09350

(51) Int. Cl.
*C07C 1/00* (2006.01)
*B01J 19/00* (2006.01)
(Continued)

(52) U.S. Cl.
CPC .......... *B01J 19/0006* (2013.01); *B01J 4/002* (2013.01); *B01J 8/1827* (2013.01); *B01J 8/22* (2013.01);
(Continued)

(58) Field of Classification Search
CPC ... B01J 4/002; B01J 8/1827; B01J 8/22; B01J 2208/00902; B01J 2219/00225;
(Continued)

(56) References Cited

U.S. PATENT DOCUMENTS 7,575,730 B2    8/2009  Steynberg
2003/0129110 A1*  7/2003  Steynberg ............... B01J 4/002
                                                422/245.1
(Continued)

FOREIGN PATENT DOCUMENTS

GB      2410906     8/2005
WO    2005084790    9/2005
(Continued)

OTHER PUBLICATIONS

Mokveld: "shut-off valves" (2004); pp. 1-12.*
(Continued)

*Primary Examiner* — Philip Y Louie
*Assistant Examiner* — Aaron W Pierpont
(74) *Attorney, Agent, or Firm* — Pabst Patent Group LLP

(57) ABSTRACT

A method is provided of shutting down an operating three-phase slurry bubble column reactor (10) having downwardly directed gas distribution nozzles (30) submerged in a slurry body (19) of solid particulate material suspended in a suspension liquid contained inside a reactor vessel (12), with the gas distribution nozzles (30) being in flow communication with a gas feed line (26) through which gas is fed to the gas distribution nozzles (30) by means of which the gas is injected downwardly into the slurry body (19). The method
(Continued)

includes abruptly stopping flow of gas from the gas feed line (26) to the gas distribution nozzles (30) to trap gas in the gas distribution nozzles (30) thereby to inhibit slurry ingress upwardly into the gas distribution nozzles (30).

14 Claims, 1 Drawing Sheet

(51) Int. Cl.
| | | |
|---|---|---|
| *B01J 8/18* | (2006.01) | |
| *B01J 8/22* | (2006.01) | |
| *B01J 4/00* | (2006.01) | |
| *C10G 49/12* | (2006.01) | |
| *C10G 2/00* | (2006.01) | |

(52) U.S. Cl.
CPC ............. *C10G 2/342* (2013.01); *C10G 2/344* (2013.01); *C10G 49/12* (2013.01); *B01J 2208/00132* (2013.01); *B01J 2208/00274* (2013.01); *B01J 2208/00362* (2013.01); *B01J 2208/00539* (2013.01); *B01J 2208/00548* (2013.01); *B01J 2208/00637* (2013.01); *B01J 2208/00884* (2013.01); *B01J 2208/00902* (2013.01); *C10G 2300/4031* (2013.01)

(58) Field of Classification Search
CPC .... B01J 2219/00259; B01J 2219/00261; B01J 2219/00263; B01J 2219/00265; C10G 2/342; C10G 2/344; C10G 2300/4031
USPC ............. 585/733; 422/537; 137/511, 565.15, 137/601.21
See application file for complete search history.

(56) References Cited

U.S. PATENT DOCUMENTS

| | | | |
|---|---|---|---|
| 2005/0209351 A1* | 9/2005 | Mohedas | ............... B01J 8/1809 518/726 |
| 2010/0184874 A1 | 7/2010 | Hoek | |
| 2011/0284777 A1* | 11/2011 | Pitchford | ............. F16K 31/086 251/65 |
| 2012/0177539 A1* | 7/2012 | Onishi | .................. C10G 2/342 422/105 |

FOREIGN PATENT DOCUMENTS

| | | | | |
|---|---|---|---|---|
| WO | 2005094979 | | 10/2005 | |
| WO | 2005026293 | | 3/2006 | |
| WO | 2007086612 | | 8/2007 | |
| WO | WO 2012080933 A1 * | 6/2012 | ............ B01J 8/1827 |
| WO | 2012080933 | | 8/2013 | |
| WO | 2013164583 | | 11/2013 | |

OTHER PUBLICATIONS

Emerson: "Slam-shut Valves" (2009); pp. 1-11.*
International Search Report and Written Opinion for PCT/IB2014/066587 dated Apr. 28, 2015.
International Preliminary Report on Patentability for PCT/IB2014/066587 dated Mar. 22, 2016.

* cited by examiner

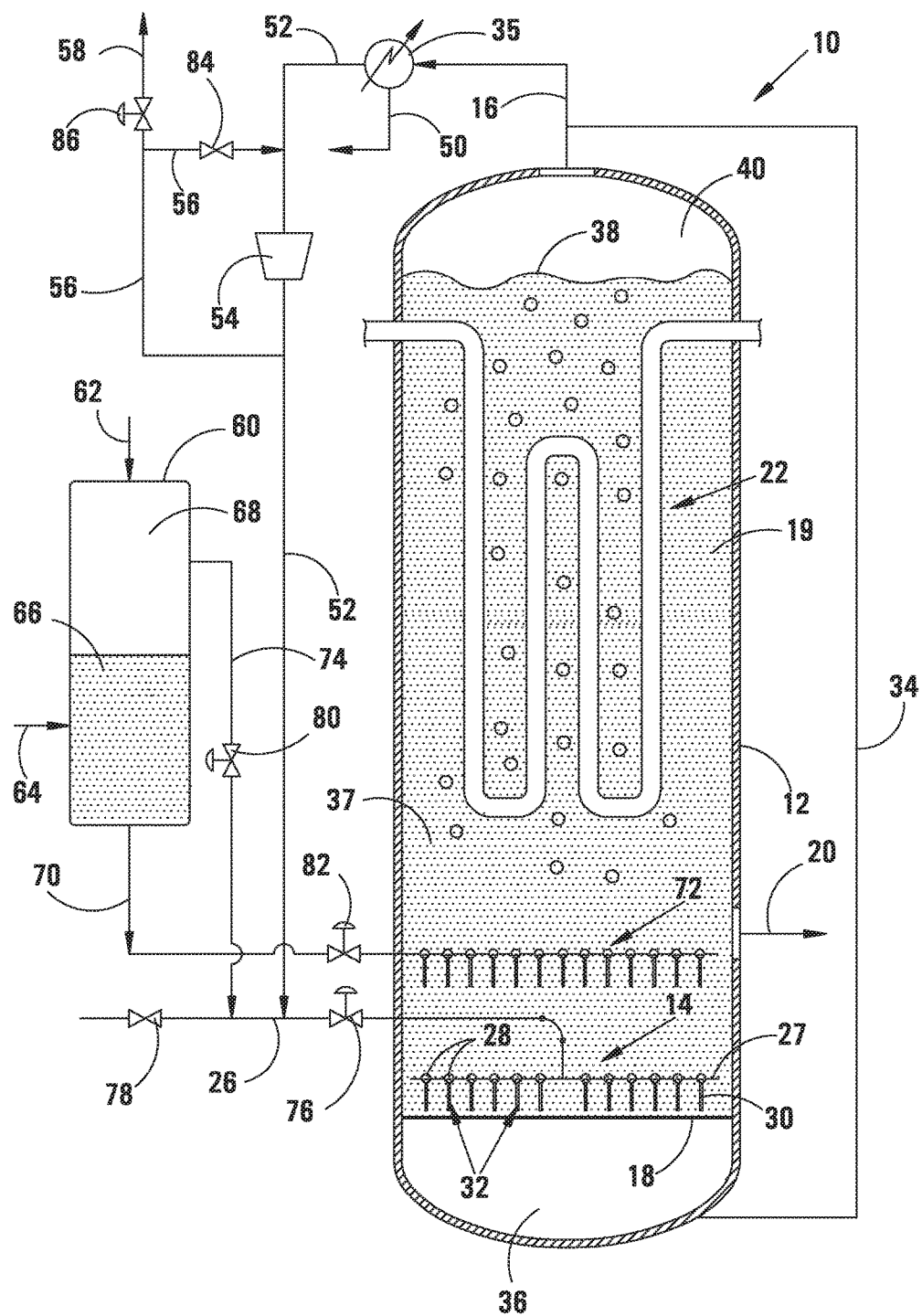

METHOD OF SHUTTING DOWN AN OPERATING THREE-PHASE SLURRY BUBBLE COLUMN REACTOR

CROSS-REFERENCE TO RELATED APPLICATION

The present application is a 371 application of International Application No. PCT/IB2014/066587, which claims benefit and priority to South African Patent Application No. 2013/09350, filed Dec. 11, 2013, all of which are incorporated herein by reference.

THIS INVENTION relates to a method of shutting down an operating three-phase slurry bubble column reactor.

One of the methods to synthesize hydrocarbons, used for production of liquid fuels and chemicals, is a technology known as GTL (Gas to Liquid). In this method natural gas is reformed to produce synthesis gas, comprising mainly hydrogen and carbon monoxide. Synthesis gas can also be produced on an industrial scale by gasification of coal. Using Fischer-Tropsch hydrocarbon synthesis reactions, hydrocarbons are then produced by contacting the synthesis gas with a Fischer-Tropsch catalyst under reaction conditions of elevated pressure and temperature. Fischer-Tropsch reactions are often conducted in a three-phase slurry bubble column reactor.

In this type of reactor, when used for Fisher-Tropsch synthesis, a solid particulate catalyst is suspended in a liquid hydrocarbon phase, thereby forming a slurry bed, and synthesis feed gas is introduced into the reactor at a low elevation, typically at or near a bottom of the reactor. The gas bubbles up through the liquid phase and keeps the catalyst in suspension while the hydrocarbon synthesis reactions are taking place. Due to the exothermic nature of Fisher-Tropsch hydrocarbon synthesis reactions it is very important to keep the catalyst in suspension in order to avoid hot spots and subsequent deterioration of the catalyst activity.

Synthesis feed gas is normally introduced to a three-phase slurry bubble column reactor by means of a gas distributor. The gas distributor may have downwardly facing nozzles or diffusers spaced along the length of a conduit or pipe, e.g. as illustrated in WO 2012/08933. In the design of such a gas distributor one of the objectives is to get uniform flow distribution along the length of the pipe or conduit from which the nozzles project downwardly, to ensure that each nozzle discharges gas at more or less the same rate than the other nozzles. One of the important requirements of the gas distributor is thus to provide for even gas distribution across the entire cross section of the reactor. Such a mode of operation normally prevents a high concentration of catalyst in one place or formation of stagnant zones in the reactor. Such stagnant zones have poor heat and mass transfer characteristics that may lead to hot spots, chanelling and uncontrollable reactions.

It is highly undesirable to allow slurry, particularly if it contains catalyst, to enter a gas distributor. The slurry may block the flow of gas through the gas distributor and the presence of catalyst may lead to uncontrollable temperature rise inside the gas distributor.

The preferences and principles for the design of a gas distributor to ensure the uniform distribution of gas are well known in the art. It would be desirable to design the gas distributor in such a way that all nozzles have the same distance from the bottom of the reactor. This could be achieved, for example, by installing a flat plate or false bottom or floor below the gas distributor creating a planar horizontal surface, as taught for example by GB 2410906. It is then easy to construct the gas distributor with nozzles of equal length thereby to achieve equidistance between the downwardly directed nozzle outlets and the flat plate, which then defines a bottom boundary of the slurry volume.

Alternatively, the nozzles may be located at different elevations or may be of different lengths, ensuring equidistance between the nozzle outlets and a hemispherical reactor bottom, as taught amongst others by WO 2005/094979.

The advice given in the well-known Perry's Chemical Engineers' Handbook, 5th Edition, for the design of a gas distributor is that in order to provide proper distribution it is necessary to restrict the gas flow from the distributor so that a suitably large pressure drop across each nozzle can be maintained. According to this text book, the pressure drop across the distributor should thus be at least 30% of the bed pressure drop. While it is possible to fulfil these requirements during normal operation of a three-phase slurry bubble column reactor, when gas is fed to the reactor at a steady and high rate, this is not the case during planned or emergency shutdown of the reactor, when the feed gas rate decreases and eventually completely stops. In short, these conditions are difficult to maintain at conditions of low flow of gas to the distributor, when the pressure drop over each nozzle naturally reduces. If the minimum pressure drop is not maintained, slurry ingress into the nozzles may occur due to maldistribution of the gas in the distributor.

Various gas distributor designs have been suggested for use in slurry bubble column reactors. Of these, gas distributors situated close to the bottom of the reactor are particularly popular. Usually, the nozzles have orifices of equal size in order to create a certain minimum pressure drop as gas is injected into the slurry bed. This pressure drop ensures a homogeneous distribution of gas flow through the various nozzles. The nozzles normally also have a pipe of diameter substantially larger than that of the orifice extending in the direction of flow, e.g. downwardly, and away from the orifice. This reduces the flow velocity of the gas before the gas enters the slurry bed, thereby reducing the momentum and kinetic energy of the gas jet to prevent or reduce mechanical damage to the catalyst.

During planned or unplanned shutdown of a three-phase slurry bubble column reactor, the flow of gas to the gas distributor reduces over time until it ceases. During this time period when the gas flow is decreasing, conditions of low gas flow occur and the pressure drop over the gas distributor drops below the required minimum with a resulting unequal distribution of gas to the various nozzles. Especially those nozzles receiving the least amount of gas are then very prone to slurry ingress, which can block the nozzles and cause a thermal run away or cause catalyst breakup.

GB 2410906 discloses a gas distributor with a flat, apertured plate below the gas distributor for supporting settled solid particles. At least some of the gas distributor nozzles are facing downwards, which helps to sweep some of the catalyst particles away from the apertured plate. The reference acknowledges the problems associated with interrupting the normal gas flow to the slurry reactor, namely ingress of slurry into the sparger and settling of catalyst that may cause hot spots. It proposes a technical solution that includes a gas distributor with an inlet to which a purge fluid line is connected, and an outlet that is connected to a collection vessel. Valves are installed on the inlet line, the purge fluid line and the outlet line. In the event of slurry backflow into the gas distributor as a result of an interruption in the gas feed, the slurry can be flushed with a purge fluid from the gas distributor to the collection vessel. This reference thus teaches a method of clearing slurry from a gas distributor after slurry ingress has already occurred and requires a complicated system of pipes, a series of valves that need to be opened and closed in a specific sequence, and additional vessels. This reference also mentions the possibility of a liquid quench sparger, typically positioned above the gas distributor, which can introduce a quench liquid into the slurry bed to prevent temperature excursions.

US 2012/0177539 discloses a slurry bubble column reactor for Fischer-Tropsch hydrocarbon synthesis where a spare gas supply line is connected to a synthesis gas supply line. In the event that the synthesis gas supply is stopped, a first on/off valve is operated to shut off the synthesis gas supply. Subsequently, a second on/off valve is opened to allow an inert gas to pass via the spare gas supply line to the gas distributor. The inert gas can be kept under pressure in a vessel external to the reactor and discharged through the spare gas supply line to the gas distributor. This reference teaches that, while maintaining the flow of inert gas to the reactor, the ingress of slurry into the gas distributor may be avoided. The contents of the reactor are heated to avoid solidification and to aid catalyst suspension induced by the inert gas flow. According to this reference, it is necessary to maintain the flow of inert gas to prevent slurry ingress into the gas distributor.

WO 2007/086612 discloses a gas distributor with downward facing nozzles, with a horizontal barrier member installed below the gas distributor so that gas ejected from the nozzles aids in the re-dispersion of catalyst particles that may have settled on the horizontal barrier member. No solution is provided for the problem of slurry ingress into the gas distributor under conditions when the gas feed is interrupted.

WO 2005/094979 discloses a gas distributor with downward facing nozzles in a reactor with a curved or hemispherical bottom characterised in that all nozzles have the same distance to the bottom of the reactor. However, no solution is provided to prevent slurry ingress into the nozzles during an interruption of the gas feed.

WO 2005/084790 also recognises the problem of slurry ingress into gas distributors in Fischer-Tropsch slurry reactors and proposes the use of downward facing gas outlets that are located well below a main body of a gas distribution system (preferably between 1 and 3 meters), thereby preventing slurry ingress into the gas distribution system. The injection of suitable liquid fluids into the gas stream that flows through the gas distribution system to remove catalyst particles are also disclosed. As the flow pattern of the gas in the gas distribution system is substantially downwardly directed, the injected liquid will wash away catalyst particles or deposits that may be present in the gas distribution system. Even though the height difference between the gas outlets and the main body of the gas distributor may discourage the ingress of slurry right up to the main body of the gas distributor, it is inevitable that the slurry will penetrate the gas outlets or nozzles during times of low feed gas flow. When normal operation is resumed, the slurry has to be flushed out of these nozzles which, amongst other problems, can put mechanical stress on the catalyst or cause blockages of the nozzles. The size of the gas distributor system to provide the necessary height difference between the main body of the gas distributor system and the gas outlets or nozzles also consumes a sizable volume of reactor space.

In short, methods of preventing slurry ingress by maintaining gas flow through the nozzles of a gas distributor have been proposed. Methods to remove slurry from a gas distributor after slurry ingress has already occurred have also been recommended. There is however still a need for a method of shutting down a reactor that prevents slurry ingress into the gas distributor, but which does not require gas flow through the nozzles to be maintained.

According to the invention, there is provided a method of shutting down an operating three-phase slurry bubble column reactor having downwardly directed gas distribution nozzles submerged in a slurry body of solid particulate material suspended in a suspension liquid contained inside a reactor vessel, with the gas distribution nozzles being in flow communication with a gas feed line through which gas is being fed to the gas distribution nozzles by means of which the gas is injected downwardly into the slurry body, the method including abruptly stopping flow of gas from the gas feed line to the gas distribution nozzles to trap gas in the gas distribution nozzles thereby to inhibit slurry ingress upwardly into the gas distribution nozzles.

Abruptly stopping flow of gas from the gas feed line to the downwardly directed gas distribution nozzles typically involves activating a fast response valve in the gas feed line to close off the gas feed line from the gas distribution nozzles.

The fast response valve is preferably located as close to the gas distribution nozzles as possible, e.g. as close to a gas distributor which includes the gas distribution nozzles as possible. Typically it would be positioned in close proximity to an outside wall or shell of the reactor vessel.

The gas distributor is preferably fitted with the downwardly directed gas distribution nozzles having outlets that are at the same elevation, i.e. in the same horizontal plane. This arrangement provides a particular advantage. Where this is not the case, i.e. where the outlets of the gas distribution nozzles are not at the same elevation, differences in hydrostatic pressure will result in slurry ingress into nozzles at a lower elevation. When the outlets of the nozzles are situated at in the same horizontal plane this scenario does not occur or it is at least inhibited from occurring.

Typically, a recycle compressor or blower is used to recycle gas from a head space of the reactor vessel to the gas feed line upstream of the fast response valve. The method may include opening a compressor kickback or compressor recycle line from a discharge end of the recycle compressor to a suction end of the recycle compressor, allowing the recycle compressor to continue running.

The method may also include venting excess gas, e.g. to a flare system.

The solid particulate material may be a catalyst.

As will be appreciated, when the gas being fed to the downwardly directed gas distribution nozzles is reactive in the presence of the slurry, e.g. when the gas is synthesis gas and the slurry includes a hydrocarbon synthesis catalyst, reactive gas trapped in the downwardly directed gas distribution nozzles offers only temporary protection against ingress of slurry upwards into the downwardly directed gas distribution nozzles, as reactive gas will be catalysed to react at a reactive gas/slurry interface or boundary, leading to a diminishing in the volume of the reactive gas trapped in the downwardly directed gas distribution nozzles and the eventual ingress of slurry into the downwardly directed gas distribution nozzles over time.

The method may thus include first replacing the flow of reactive gas to the downwardly directed gas distribution nozzles with a flow of inert gas, at least partially flushing reactive gas from the downwardly directed gas distribution nozzles with the inert gas thereby at least partially replacing the reactive gas in the downwardly directed gas distribution nozzles, before abruptly stopping flow of inert gas from the gas feed line to the downwardly directed gas distribution nozzles, to trap inert gas in the downwardly directed gas distribution nozzles thereby to inhibit slurry ingress upwardly into the downwardly directed gas distribution nozzles. Advantageously, inert gas trapped in the downwardly directed gas distribution nozzles provides superior resistance to slurry ingress than reactive gas, possibly until flow of reactive gas is restored again and the three-phase slurry bubble column reactor is brought into operation again. Alternatively or in addition, the reactor contents may be cooled to stop the reaction.

Replacing the flow of reactive gas to the downwardly directed gas distribution nozzles with a flow of inert gas may include closing off the flow of reactive gas to the downwardly directed gas distribution nozzles, whilst introducing inert gas to the downwardly directed gas distribution nozzles. This may be effected simultaneously by closing a feed gas valve in the feed gas line to stop the flow of reactive gas along the feed gas line, and opening a valve in an inert gas feed line to feed inert gas into the feed gas line downstream of the feed gas valve and upstream of the downwardly directed gas distribution nozzles.

The fast response valve may be located in the feed gas line, downstream from where the inert gas feed line feeds into the feed gas line.

Replacing the flow of reactive gas to the downwardly directed gas distribution nozzles with a flow of inert gas may include establishing flow communication between a pressurized vessel holding inert gas and the gas feed line to the downwardly depending gas distribution nozzles.

The inert gas should be a gas which does not participate in the reaction or reactions taking place in the reactor vessel under normal operating conditions of the reactor vessel, which does not change chemically and which does not affect the catalyst. It is thus to be understood that the inert gas should be inert at the conditions at which the reactor is at the time the inert gas is introduced. Hydrogen, tail gas or even synthesis gas may be used as an inert gas instead of a conventional inert gas such as a non-radioactive noble gas or nitrogen if the reactor contents are cooled sufficiently to stop further reaction.

The inert gas may thus be selected from the group consisting of one or more rare gases, nitrogen, and other gases which do not participate in the reaction or reactions taking place in the reactor vessel under normal operating conditions of the reactor vessel, which do not change chemically and which do not affect the catalyst, and mixtures thereof.

In one embodiment of the invention, the inert gas is selected from the group consisting of one or more rare gases, nitrogen, and mixtures thereof.

The three-phase slurry bubble column reactor may be a hydrocarbon synthesis reactor being fed with synthesis gas along the gas feed line. In one embodiment of the invention, the three-phase slurry bubble column reactor is a Fischer-Tropsch hydrocarbon synthesis reactor.

When the three-phase slurry bubble column reactor is a hydrocarbon synthesis reactor, the inert gas is preferably nitrogen.

As indicated hereinbefore, the downwardly directed gas distribution nozzles typically form part of a gas distributor. The gas distributor is typically located in a lower portion of the reactor vessel, preferably at or near a bottom of the reactor vessel.

The fast response valve may have a response time of between about 1 and about 10 seconds, preferably between about 1 and about 5 seconds from the time of activation until the valve is fully closed. In this specification, abruptly stopping flow of gas from the gas feed line to the downwardly directed gas distribution nozzles thus means stopping flow of gas from the gas feed line to the downwardly directed gas distribution nozzles in no more than about 10 seconds, preferably no more than about 8 seconds, more preferably no more than about 6 seconds, e.g. in less than or within 5 seconds.

The method may include feeding a quench fluid into the slurry of the reactor vessel of the three-phase slurry bubble column reactor. Numerous well known configurations, including nozzles on the reactor shell, may be used to introduce the quench liquid. Typically, the quench fluid is fed through a quench sparger in the vicinity of the gas distributor, e.g. immediately above the gas distributor. The quench sparger may thus be a dedicated quench sparger used only for quenching of the slurry with the quench fluid during a planned or an emergency shutdown of the reactor vessel. The quench liquid is introduced in a manner which ensures good mixing in order to decrease the temperature of the reactor contents, particularly in the vicinity of a feed gas distributor, in order to stop further reaction.

The quench fluid may be a liquid at ambient conditions.

The quench fluid may be, or may be derived from, a product from the three-phase slurry bubble column reactor. When the three-phase slurry bubble column reactor is a Fischer-Tropsch hydrocarbon synthesis reactor, the quench fluid may be a highly paraffinic hydrocarbon, typically in the diesel boiling range.

The quench fluid and the inert gas may be contained in the same or a common pressurised vessel. For example, the quench fluid, when a liquid, may fill a bottom portion of the common pressurised vessel and the inert gas may fill an upper portion or head space of the common pressurised vessel, the inert gas being pressurised and thus providing a motive force for displacing the quench fluid and/or the inert gas from the common pressurised vessel.

The method may include first feeding the inert gas to the downwardly directed gas distribution nozzles, before feeding the quench fluid into the slurry in the reactor vessel. If desired however, the method may include simultaneously feeding the inert gas to the downwardly directed gas distribution nozzles and feeding the quench fluid into the slurry in the reactor vessel. Typically the initial action is to purge the gas distributor with nitrogen from said head space of said pressurised vessel. Nitrogen sparging is typically terminated, particularly in the case of an emergency shutdown, after about 5 seconds, which is the time required to fully close said fast response valve in the gas feed line. Immediately after the nitrogen sparging terminates, diesel from said pressurised vessel is then injected into the bottom of the reactor vessel through said dedicated quench sparger, located slightly above the gas distributor.

The three-phase slurry bubble column reactor may be operated in a process selected from the group consisting of coal liquefaction, methanol synthesis, higher alcohol synthesis, hydrogenation processes, and hydrocarbon synthesis from carbon monoxide and hydrogen. It is however expected that the method of the invention will find particular application in the shutting down of a three-phase slurry bubble column reactor used in a hydrocarbon synthesis process in which hydrocarbons are synthesised from carbon monoxide and hydrogen using an iron or cobalt catalyst, i.e. a Fischer-Tropsch hydrocarbon synthesis process.

The three-phase slurry bubble column reactor may include a partition or barrier member spanning across the reactor vessel below the downwardly directed gas distribution nozzles. An advantage of such a partition under normal operating conditions is that the downwardly directed gas distribution nozzles inject gas into the slurry body towards the partition may help to sweep away catalyst which settles on the partition, thereby preventing or inhibiting catalyst lay-down, as described in WO 2012/080933.

The partition or barrier member may be fluid-impermeable. When the partition is fluid-impermeable, the three-phase slurry bubble column reactor may include a pressure transfer passage or conduit passing through or around the partition or barrier member allowing transfer of pressure into and from a bottom volume, below the partition or barrier member, the pressure transfer passage in use establishing pressure communication between the bottom volume and the head space of the reactor vessel above the slurry body thereby to maintain a differential pressure over the partition between predefined or preselected limits by manipulating or allowing changes in the pressure in the bottom volume. Such an arrangement is also described in WO 2012/080933.

Instead of being fluid-impermeable, the partition may be in the form of an apertured support for supporting settled solid particles. Typically, the apertures of the apertured support are small enough in use to prevent at least 90% by mass, preferably at least 96% by mass, e.g. about 98% by mass of the solid particles in the slurry body from passing therethrough. A fluid inlet may be provided below the apertured support to allow for the introduction of a fluid into the reactor vessel below the apertured support to keep catalyst particles that pass through the apertures in suspension and to prevent catalyst concentrating at a bottom of the reactor vessel. Such an arrangement is described in U.S. Pat. No. 7,575,730.

The partition or barrier member may be planar, and may be arranged in a horizontal plane.

The invention will now be described, by way of example, with reference to the single diagrammatic drawing which shows a three-phase slurry bubble column reactor adapted to allow the three-phase slurry bubble column reactor to be shut down using the method of the invention.

Referring to the drawing, reference numeral 10 generally indicates a three-phase slurry bubble column reactor which is adapted so that the three-phase slurry bubble column reactor can be shut down, whether in a planned fashion or an unplanned or emergency fashion, using the method of the invention.

The three-phase slurry bubble column reactor 10 includes an upright circular cylindrical Fischer-Tropsch hydrocarbon synthesis three-phase slurry reactor vessel 12 with a diameter of typically at least 1 meter, preferably at least 7.5 meter, more preferably at least 9 meter, and a gas distributor 14 located in a bottom portion of the reactor vessel 12, near a bottom of the reactor vessel 12. A gaseous products withdrawal line 16 leads from a top of the reactor vessel 12. A horizontally arranged solid fluid-impermeable planar partition or barrier member 18 is provided in the bottom portion of the reactor vessel 12, below the gas distributor 14. The partition 18 partitions the reactor vessel 12 into a slurry volume 19 above the partition 18, and a bottom volume 36 below the partition 18. A liquid phase withdrawal line 20 is provided below an outlet leading to the gaseous products withdrawal line 16 but above the partition 18. A bank 22 of cooling tubes is located above the gas distributor 14 but below the outlet to the gaseous components withdrawal line 16.

The gas distributor 14 is in flow communication with a gas feed line 26. The gas distributor 14 may be of any suitable design for feeding a gas into a slurry bed, provided it includes downwardly directed gas distribution nozzles or diffusers 30. The gas distributor 14 may for example be made up of or include radially extending branch pipes connected to concentric rings or tubular toroids, or be made up of or include a system of horizontal distributor pipes branching into smaller horizontal pipes, or be made up of or include a pipe arranged in a spiral in a horizontal plane. In the embodiment illustrated in the drawing, the gas distributor 14 includes a header 27 in flow communication with a plurality of lateral pipes 28 and with the gas feed line 26. A plurality of the gas distribution nozzles or diffusers 30 extend downwardly from each of the lateral pipes 28 with each nozzle or diffuser 30 defining a downwardly facing gas outlet 32 and with all of the outlets 32 being spaced equidistantly from the partition 18. The outlets 32 are thus in a common horizontal plane. Each nozzle or diffuser 30 is associated with an orifice in the pipe 28 from which it depends, with each orifice and its associated nozzle or diffuser 30 defining a gas injector, and with the gas injectors thus being distributed across the cross-sectional area of the reactor vessel 12. It is however to be appreciated that the particular design of the gas distributor 14 will vary from application to application and that fairly complicated designs may be employed. The various further design possibilities for a gas distributor for a three-phase slurry bubble column reactor however do not fall within the scope of the invention and are not further discussed.

The partition 18 is welded to the reactor vessel 12 using a welding expansion ring in conventional fashion and may include further supports such as I-beams also welded to the reactor vessel 12. The design and manufacture of a reactor vessel 12 with a false floor or partition 18 fall within the knowledge of a person skilled in the art but outside the scope of the present invention and these aspects are also not further discussed. Typically, the partition 18 includes at least one manhole (not shown) with a lid to allow access to the bottom volume 36 below the partition 18.

In use, the slurry volume 19 holds a slurry bed 37. The slurry bed 37 has an expanded height with an upper surface 38 above the bank 22 of cooling tubes but below the outlet leading into the gaseous product withdrawal line 16, leaving a head space 40 to disengage gaseous components from the slurry bed 37.

A pressure transfer passage 34 is provided to manipulate or allow changes in the operating pressure in the bottom volume 36 thereby limiting the pressure differential across the partition 18. The pressure transfer passage 34 extends between the gaseous product withdrawal line 16 and the bottom volume 36, allowing the pressure in the bottom volume 36 in use to be equalized with the pressure in the gaseous product withdrawal line 16, i.e. in essence with the pressure in the head space 40. Such an arrangement is disclosed in WO 2012/080933.

The three-phase slurry bubble column reactor 10 also includes a partial condenser 35 with a liquid product withdrawal line 50 and a gas recycle line 52. A recycle gas compressor 54 is provided in the gas recycle line 52. A kickback line 56 runs from a discharge end of the recycle gas compressor 54 back to a suction end of the recycle gas compressor 54, with a vent line 58 branching off from the kickback line 56.

The three-phase slurry bubble column reactor 10 further includes a quench vessel 60 with a nitrogen replenish line 62 and a diesel replenish line 64. In use, the quench vessel 60 holds diesel 66 in a bottom portion thereof, with an upper portion or a head space 68 of the quench vessel 60 being occupied by pressurised gaseous nitrogen. Typically, the quench vessel 60 holds the nitrogen at a pressure of about 10 to 12 bar above the normal operating pressure at the bottom of the reactor vessel 12, and sufficient diesel to fill the reactor vessel to a height of at least 0.15 m.

A diesel quench line 70 leads from a bottom of the quench vessel 60 to a diesel quench distributor 72 which is located between the bank 22 of cooling coils and the gas distributor 14.

A nitrogen gas feed line 74 runs from the head space 68 of the quench vessel 60 and joins the gas feed line 26.

A normally open fast response valve 76 is provided in the gas feed line 26, downstream from where the nitrogen gas feed line 74 joins the gas feed line 26. A normally open synthesis gas fast shut-off valve 78 is provided in the gas feed line 26, upstream of where the nitrogen gas feed line 74 joins the gas feed line 26.

The nitrogen gas feed line 74 is provided with a normally closed nitrogen control valve 80 and the diesel quench line 70 is provided with a normally closed diesel control valve 82. The kickback line 56 is also provided with a normally closed kickback valve 84 whereas the vent line 58 is provided with a vent valve 86.

The three-phase slurry bubble column reactor 10 may include many additional features commonly found in or on slurry bubble column reactors or similar slurry phase apparatus, such as means for loading and withdrawing catalysts, means for draining spaces, means for filtering catalyst from liquid phase, mixing devices such as downcomers or draft tubes and the like. Such features would typically however be conventional and known to those skilled in the art and need not further be described.

The three-phase slurry bubble column reactor 10 illustrated in the drawing is used in a Fischer-Tropsch process to synthesise hydrocarbons from synthesis gas which includes carbon monoxide and hydrogen, using an appropriate catalyst, such as an iron or supported cobalt catalyst. Synthesis gas, comprising mainly carbon monoxide and hydrogen, thus enters the submerged gas distributor 14 from the gas feed line 26 and is injected into the slurry bed 37 through the downward facing gas outlets 32 of the downwardly directed gas distribution nozzles or diffusers 30, in order to maintain the slurry bed 37 in a churn turbulent state. The gas is thus injected downwardly through the gas distribution nozzles or diffusers 30 and out through the gas outlets 32, towards the partition 18.

The slurry bed 37 comprises the catalyst particles suspended in liquid product, i.e. liquid Fischer-Tropsch wax produced in the reactor vessel 12 on the action of the gaseous reactants. The catalyst particles are maintained in suspended state in the slurry bed 37 by means of the turbulence created therein by the gas passing or bubbling upwardly therethrough from the gas distributor 14 towards the head space 40.

For exothermic Fischer-Tropsch hydrocarbon synthesis reactions, the reactor vessel 12 is typically maintained at an operating pressure of between about 10 bar and about 40 bar, more typically between about 20 bar and about 30 bar, and at an operating temperature of between about 180° C. and about 280° C., typically about 220° C. to about 280° C. The operating pressure and the operating temperature selected may depend on the nature and spread of gases and liquid product required, and the type of catalyst used. Naturally, the three-phase slurry bubble column reactor 10 is provided with suitable temperature control means such as the bank 22 of cooling tubes for controlling the reaction temperatures, as well as suitable pressure control means such as one or more pressure control valves.

In the reactor vessel 12, as the synthesis gas passes or bubbles upwardly through the slurry bed 37, the carbon monoxide and hydrogen react to form a range of products in accordance with known Fischer-Tropsch hydrocarbon synthesis reactions. Some of these products are in gaseous form at the operating conditions of the reactor vessel 12 and are withdrawn, together with unreacted synthesis gas, through the gaseous product withdrawal line 16. Some of the products produced, such as the wax already mentioned, are in liquid form at the operating conditions of the vessel 12 and act as the suspension medium for the catalyst particles. As liquid product is formed, the level 38 of the slurry bed 37 naturally tends to rise and the liquid product is thus withdrawn, by means of the liquid phase withdrawal line 20 to maintain the slurry bed level 38 at a desired level and to ensure an adequate head space 40. Catalyst particles may be separated from the liquid phase either internally of the reactor vessel 12, using suitable filters (not shown) or externally. Naturally, if separation occurs externally, the catalyst is preferably returned to the slurry bed 37.

As a result of the pressure adjustment or manipulation or balancing through the pressure transfer passage 34, the partition 18 does not have to form part of the pressure envelope of the three-phase slurry bubble column reactor 10, as differential pressures over the partition 18 can be kept within predefined limits which are orders of magnitude less than the operating pressure of the reactor vessel 12. The design pressure of the partition 18 is determined by the maximum differential pressure immediately above and below the partition 18 for various modes of operation (e.g. a slumped slurry bed) in the upward and downward direction respectively. So, for example, the partition 18 will still have to be designed to carry the weight of the slurry bed under slumped conditions in the downward direction. Under normal operating conditions however, the differential pressure over the partition 18 can be limited, for example, to less than about 50 to 150 kPa by means of the pressure transfer passage 34.

During normal operation of the three-phase slurry bubble column reactor 10 there is a sufficiently high flow of synthesis gas through the gas distributor 14 and its gas distribution nozzles or diffusers 30 to prevent slurry from the slurry bed 37 from entering the gas distribution nozzles or diffusers 30 and the header 27 and lateral pipes 28. When for any reason the synthesis gas flow rate through the gas distribution nozzles or diffusers 30 reduce significantly, a minimum pressure drop over the gas distributor 14 is no longer maintained and it is possible that slurry from the slurry bed 37 may enter the gas distributor 14 through the downwardly directed gas distribution nozzles or diffusers 30. Typically, such a situation of low synthesis gas flow occurs when the three-phase slurry bubble column reactor 10 is being shut down in a planned fashion, or during an emergency shutdown of the three-phase slurry bubble column reactor 10.

In order to prevent or inhibit slurry from entering the gas distributor 14, the method in accordance with the invention for shutting down the three-phase slurry bubble column reactor 10, in a preferred embodiment, includes first replacing the flow of synthesis gas through the gas feed line 26 to the gas distributor 14 with gaseous nitrogen from the quench vessel 60. Thus, during shutdown of the three-phase slurry bubble column reactor 10, whether in a planned fashion or on an emergency basis, the nitrogen control valve 80 is opened to introduce gaseous nitrogen into the gas feed line 26, and the synthesis gas shut off valve 78 is closed to prevent further flow of synthesis gas to the gas distributor 14. Gaseous nitrogen from the pressurised head space 68 thus flushes synthesis gas from the feed gas line 26 and from the gas distributor 14 and enters the slurry bed 37 through the downwardly directed gas distribution nozzles or diffusers 30 from where the nitrogen bubbles upwardly and is removed by means of the gaseous product withdrawal line 16.

In order to cool or quench the slurry bed 37, diesel as a quench fluid is fed from the quench vessel 60 to the diesel quench distributor 72 by opening the diesel control valve 82 in the diesel quench line 70. The diesel quench may occur immediately after nitrogen purging, or even simultaneously with nitrogen purging. As the quench vessel 60 is maintained at a pressure which is higher than the operating pressure of the reactor vessel 12, and as nitrogen purging is stopped if the pressure in the quench vessel 60 drops by 2 bar thereby ensuring sufficient pressure for diesel quenching, diesel is forced from the quench vessel 60 into the slurry bed 37 and cools the slurry bed 37 quickly. For a large commercial three-phase slurry bubble column reactor such as the reactor 10, a diesel volume equivalent to at least 0.15 m of reactor height is sufficient to prevent a rise in temperature in the settled catalyst bed due to reaction of residual synthesis gas. The diesel is transferred to the reactor 10 in less than a minute, e.g. about 50 seconds to ensure rapid cooling of the reactor 10.

In order to avoid excess pressure in the reactor vessel 12, the vent valve 86 in the vent line 58 is opened (if not open already in order to vent gas from the reactor 10 for purposes of maintaining the desired pressure in the reactor 10) and synthesis gas and nitrogen is vented, typically to a flare system (not shown) whilst the recycle gas compressor 54 is slowed down and eventually stopped. In order to protect the recycle gas compressor 54 against surging, the kickback valve 84 in the kickback line 56 is also opened. The extent to which gas is purged from the reactor 10 may depend on the situation. If the reactor 10 is to be depressurised, e.g. because of a prolonged shutdown, then obviously the reactor 10 will be fully vented through the vent line 58 and more nitrogen purging may be employed. This may include feeding nitrogen to the reactor vessel 12 by means of the nitrogen replenish line 62 and the nitrogen gas feed line 74, via the quench vessel 60, for a prolonged period of time, before abruptly closing the fast response valve 76. If the intention is to start the reactor 10 again as soon as possible, then only limited venting will be allowed to maintain the reactor 10 at a high pressure. Nitrogen purging is then minimised by immediately closing the fast response valve 76 thereby merely to replace synthesis gas from the gas distributor 14 with nitrogen but to not dilute the synthesis gas in the reactor 10 excessively.

Once the three-phase slurry bubble column reactor 10 has been substantially purged of synthesis gas (e.g. in the case of shutting down of the reactor 10 for a prolonged period), or once at least the gas distributor 14 has been substantially purged of synthesis gas (e.g. in the case of an emergency shutdown), the fast response valve 76 is thus quickly closed thereby abruptly stopping flow of nitrogen gas from the gas feed line 26 to the downwardly directed gas distribution nozzles or diffusers 30. Typically, in the case of a short or emergency shutdown, the nitrogen is fed to the gas distributor 14 only for as long as it takes fully to close the fast response valve 76, i.e. typically no longer than about 5 seconds or until the pressure in the quench vessel 60 has dropped by about 2 bar. In this embodiment, the nitrogen control valve 80 is thus very quickly opened and at the same time the fast response valve 76 is activated to close the fast response valve 76. This is sufficient time substantially to clear the gas distributor 14 of synthesis gas, with the nitrogen replacing the synthesis gas in the gas distributor 14. Non-reactive or inert nitrogen gas is thus trapped in the downwardly directed gas distribution nozzles or diffusers 30 and inhibits slurry ingress upwardly into the downwardly directed gas distribution nozzles or diffusers 30 from the slurry bed 37, which at that time will be slumping onto the partition 18.

When the fast response valve 76 is closed the nitrogen control valve 80 is also closed and, once the slurry bed 37 is cold enough or the available diesel has been transferred to the reactor 10 under the available pressure, the diesel control valve 82 in the diesel quench line 70 is also closed. As mentioned hereinbefore, this is typically within a minute of starting the diesel quench. The three-phase slurry bubble column reactor vessel 12 can then be depressurized by means of the kickback line 56 and the vent line 58, if necessary or desirable (e.g. in the case of a planned prolonged shutdown), all the time maintaining stationary nitrogen gas bubbles in the downwardly directed gas distribution nozzles or diffusers 30. As will be appreciated, if the reactor vessel 12 is depressurised, some nitrogen will escape from the nozzles or diffusers 30 as the pressure in the reactor vessel 12 drops and the nitrogen bubbles expand. Stationary nitrogen gas bubbles will however remain trapped inside the downwardly directed gas distribution nozzles or diffusers 30 as a result of the hydrostatic pressure exerted by the slumped catalyst bed.

Prior to restarting the three-phase slurry bubble column reactor 10, the quench vessel 60 is refilled with diesel using the diesel replenish line 64, and repressurized with gaseous nitrogen using the nitrogen replenish line 62. In order to remove nitrogen from the three-phase slurry bubble column reactor 10 for purposes of restarting the reactor 10, the nitrogen is flushed out with synthesis gas using the gaseous product withdrawal line 16, the kickback line 56 and the vent line 58.

Employing the method of the invention, a three-phase slurry bubble column reactor like the three-phase slurry bubble column reactor 10 can be shut down in a planned fashion or in an emergency whilst preventing or at least substantially reducing the risk of slurry ingress into the downwardly directed gas distribution nozzles or diffusers. The method of the invention, as illustrated, avoids a time period during planned or emergency shutdown of a three-phase slurry bubble column reactor during which gas flow through the gas distributor 14 is reduced. Maldistribution of gas to the downwardly directed gas distribution nozzles or diffusers is thus minimized thereby avoiding or inhibiting ingress of slurry into the downwardly directed gas distribution nozzles or diffusers.

Advantageously, by flushing the gas distributor 14 with an inert gas such as nitrogen, prior to abruptly stopping flow of gas to the gas distributor 14, the reactive synthesis gas in the gas distributor 14 is at least diluted if not substantially completely removed, ensuring longevity of the substantially inert gas bubbles trapped in the downwardly directed gas distribution nozzles or diffusers.

Also advantageously, the method of the invention allows the flow of inert gas to the three-phase slurry bubble column reactor to be completely terminated once the reactor has been shut down. This reduces the time needed to start up the reactor again, as no additional purging of the inert gas from the reactor would be necessary as is the case when inert gas is continually fed to the gas distributor throughout the shutdown period for purposes of preventing slurry ingress into the gas distributor.

The invention claimed is:

1. A method of shutting down an operating three-phase slurry bubble column reactor having downwardly directed gas distribution nozzles submerged in a slurry body of solid particulate material suspended in a suspension liquid contained inside a reactor vessel of the three-phase slurry bubble column reactor, with the gas distribution nozzles being in flow communication with a gas feed line through which gas is fed to the gas distribution nozzles by means of which the gas is injected downwardly into the slurry body and the gas distribution nozzles having outlets that are at the same elevation with respect to each other, the method comprising stopping flow of the gas from the gas feed line to the gas distribution nozzles by activating a fast response valve in the gas feed line to close off the gas flow to the gas distribution nozzles thereby trapping gas in the gas distribution nozzles, with the trapping of the gas in the gas distribution nozzles inhibiting slurry body ingress upwardly into the gas distribution nozzles, the fast response valve having a response time of between 1 and 5 seconds from the time of activation until the valve is fully closed.

2. The method as claimed in claim 1, in which the gas is an inert gas, wherein prior to feeding the inert gas to the gas distribution nozzles, a reactive gas is fed to the gas distribution nozzles, the method comprising first replacing the flow of reactive gas to the gas distribution nozzles with a flow of the inert gas, at least partially flushing the reactive gas from the gas distribution nozzles with the inert gas thereby at least partially replacing the reactive gas in the gas distribution nozzles, before stopping the flow of the inert gas from the gas feed line to the gas distribution nozzles by activating the fast response valve, in order to trap the inert gas in the gas distribution nozzles thereby to inhibit slurry body ingress upwardly into the gas distribution nozzles.

3. The method as claimed in claim 2, wherein the inert gas is selected from the group consisting of one or more noble gases and nitrogen.

4. The method as claimed in claim 2, wherein the inert gas is nitrogen, the three-phase slurry bubble column reactor is a hydrocarbon synthesis reactor, and the reactive gas is synthesis gas.

5. The method as claimed in claim 2, which further comprises feeding a quench fluid into the slurry body of the reactor vessel of the three-phase slurry bubble column reactor.

6. The method as claimed in claim 5, wherein the quench fluid is a liquid at ambient conditions.

7. The method as claimed in claim 5, wherein the quench fluid and the inert gas are contained in a common pressurized vessel.

8. The method as claimed in claim 5, which includes further comprises first feeding the inert gas to the gas distribution nozzles, before feeding the quench fluid into the slurry in the reactor vessel.

9. The method as claimed in claim 1, wherein the gas is synthesis gas and the three-phase slurry bubble column reactor is a hydrocarbon synthesis reactor.

10. The method as claimed in claim 1, further comprising operating the three-phase slurry bubble column reactor in a process selected from the group consisting of coal liquefaction, methanol synthesis, higher alcohol synthesis, hydrogenation, and hydrocarbon synthesis from carbon monoxide and hydrogen.

11. The method as claimed in claim 10, further comprising operating the three-phase slurry bubble column reactor in a hydrocarbon synthesis process in which hydrocarbons are synthesized from carbon monoxide and hydrogen using an iron or cobalt catalyst.

12. The method as claimed in claim 1, wherein the three-phase slurry bubble column reactor includes a planar partition or barrier member below the gas distribution nozzles, the nozzles being of equal length and being spaced equal distances from the planar partition or barrier member.

13. The method as claimed in claim 5, wherein the quench fluid is fed through a quench sparger in the vicinity of a gas distributor, the quench sparger being a dedicated quench sparger used only for quenching of the slurry body with the quench fluid during a planned or an emergency shutdown of the reactor vessel.

14. A method of shutting down an operating three-phase slurry bubble column reactor having downwardly directed gas distribution nozzles submerged in a slurry body of solid particulate material suspended in a suspension liquid contained inside a reactor vessel of the three-phase slurry bubble column reactor, with the gas distribution nozzles being in flow communication with a gas feed line through which gas is fed to the gas distribution nozzles by means of which the gas is injected downwardly into the slurry body and the gas distribution nozzles having outlets that are at the same elevation with respect to each other, the method comprising stopping flow of the gas from the gas feed line to the gas distribution nozzles in no more than 10 seconds;
trapping the gas in the gas distribution nozzles; and
inhibiting slurry body ingress upwardly into the gas distribution nozzles with the trapped gas in the gas distribution nozzles.

* * * * *